UNITED STATES PATENT OFFICE.

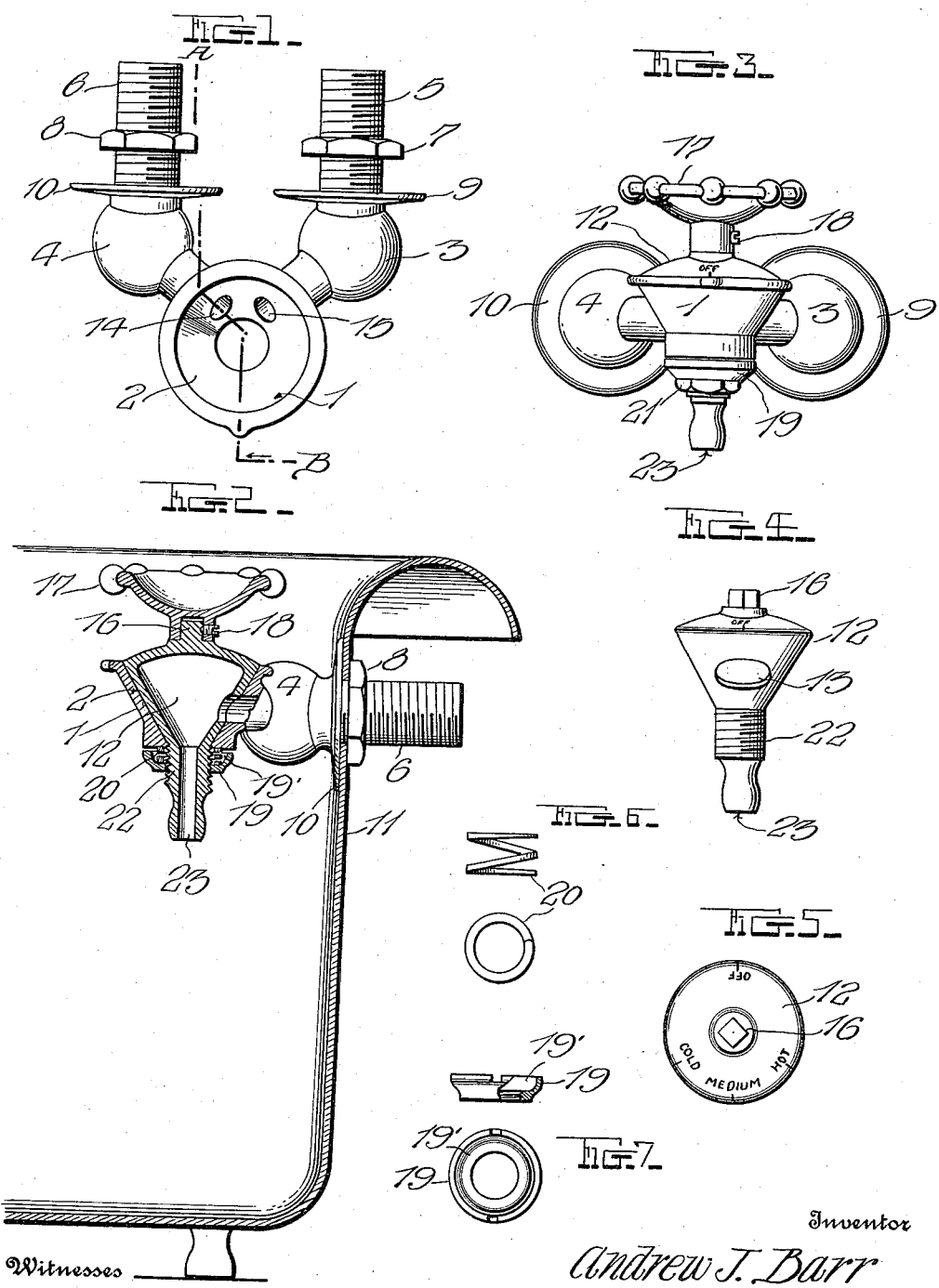

ANDREW J. BARR, OF MANSFIELD, OHIO.

VALVE.

1,158,773.  Specification of Letters Patent.  Patented Nov. 2, 1915.

Application filed February 25, 1915. Serial No. 10,495.

*To all whom it may concern:*

Be it known that I, ANDREW J. BARR, a citizen of the United States, residing at Mansfield, in the county of Richland and State of Ohio, have invented certain new and useful Improvements in Valves; and I do declare the following to be a full, clear, and exact description of the invention, such as will enable others skilled in the art to which it appertains to make and use the same.

My invention relates to improvements in valves and is especially adapted to be used where it is desired to draw hot, cold or medium water or different kinds of liquids simultaneously or separately.

One of the objects of my invention is to provide a central valve that will permit of the flow therethrough from one outlet of either hot, cold or medium water as desired and that will also permit several kinds of liquids being drawn through the valve separately or simultaneously.

One of the essential features of my invention resides in the construction of a valve which will perform the function of a plurality of valves.

My invention further consists in the construction of a hollow valve in combination with a valve body having a plurality of openings which communicate with an opening provided in the valve.

I attain these and other objects by the mechanism illustrated in the accompanying drawing in which:—

Figure 1 is a plan view of the valve body with the valve removed to show the apertures formed in the valve seat which communicates with two sources of supply. Fig. 2 is a side elevation partly in section of Fig. 1 on the lines A—B showing the valve attached to an ordinary bath-tub; Fig. 3 is an end view of my valve, the body portion and connecting means; Fig. 4 is a detail view of the valve showing an oblong opening formed therein communicating with the hollow central portion thereof; Fig. 5 is a plan view of the hollow valve showing the marks formed thereon to indicate the direction or position in which to move the valve to obtain the result desired; Fig. 6 shows a side and top view, respectively, of a compensating coil spring; Fig. 7 shows a side and top view, respectively, of a threaded washer provided with a cup-shaped end.

In the drawings, reference numeral 1 indicates the body portion of the valve casing which is provided with a tapered valve seat 2. Projecting members 3 and 4 are provided on the valve body portion and connect with and are made integral with threaded pipes 5 and 6, the ends of which are adapted to pass through suitable apertures formed in a bath-tub or other apparatus and are held in place, as shown in Fig. 2, by the nuts 7 and 8 which force the annular flanges 9 and 10 against the body 11 of the bath-tub or other apparatus making a liquid tight joint.

The valve 12 is tapered to fit the valve seat 2 and is shown in the form of a hollow inverted truncated cone-shaped member provided with an opening 13 in one side wall which communicates with the interior thereof. The opening 13 is adapted to register with openings 14 and 15 in the valve seat 2.

A rectangular nipple 16 is formed on the top of the valve 12 and engages with a corresponding socket formed in the shank of an operating wheel 17 and which is rigidly secured to said nipple by a set screw 18. The valve 12 has a hollow threaded stem 22 at its apex provided with an outlet aperture 23, which communicates with the interior of the valve. This valve is held in place upon its seat through the medium of a threaded cup-shaped nut 19, in the annular flange 19′ of which a coiled spring 20 is nested and is adapted to contact with the bottom of the body portion of the valve casing, the spring exerting a pressure to hold the valve to its seat and to automatically take up the wear of the parts. A lock nut 21 is provided to lock the cup-washer in its adjusted position.

It is to be observed that the flange 19′ of the nut 19 serves as a housing for the spring 20 to prevent wash cloths and the like from catching between the coils of such spring, and also acts as a stop flange for preventing excessive upward movement of the valve plug 12 when the flexible tube of a bath spray is being forced on the lower end of the nipple 22. I am aware that the broad use of a cup-shaped nut for receiving the lower end of the spring such as that disclosed at 20 is old in the art to which my invention relates, but in so far as I am advised, the twofold function of the flange on the nut is new, in the specific relation disclosed in the accompanying drawing.

The operation of my valve is as follows: When the valve 12 is seated upon the valve seat 2 of the body portion or casing 1 and it is desired to shut off both sources of supply 3 and 4, the valve is turned in either direction to prevent the oblong opening 13 therein from register with the openings 14 and 15; the word "Off" shown on Fig. 5 indicating the direction to turn the valve. When it is desired to draw either cold or hot water or different liquids separately from their source of supply, the valve is turned sufficiently to bring the opening 13 in direct alinement with the desired opening as indicated by the words "Cold" or "Hot" and when so positioned the other opening is closed, leaving the opening 13 in direct communication with the proper source of supply. If, however, it is desired to draw from both sources of supply simultaneously, the valve is turned to position the opening 13 so that it is directly in alinement with a portion of both openings 14 and 15 and the water or other liquid from both sources of supply will pass through the opening 13 of the hollow valve simultaneously and out through the outlet aperture 23 in the stem.

It is to be observed that the contracted lower end of the inverted cone-shaped cavity in the valve plug merges without obstruction into the outlet port of said plug. This is essential, since the cavity may serve as means compensating for a fluctuating flow of fluid, yet no obstructions will be presented upon which deleterious matter in the fluid may lodge.

I claim:—

1. In combination, a valve casing having a tapered bore whose smaller end opens through the center of the lower end of said casing, said lower end being disposed in a horizontal plane, a tapered valve plug rotatable in the bore and having formed on its contracted lower end a tubular externally threaded discharge nipple depending below the casing and designed for reception in the flexible tube of a bath spray, a nut threaded on the nipple and spaced below the lower end of the casing, a coiled spring surrounding the nipple and compressed between the nut and the casing, and an annular guard and stop flange surrounding the spring and extending from the nut into close proximity to the horizontal lower end of the casing, whereby to prevent catching of wash cloths and the like on the spring, and to also prevent excessive endwise shifting of the plug in the casing when the tube of a bath spray is being forced onto the discharge nipple.

2. A valve comprising a casing in the form of an inverted truncated cone terminating at its upper and lower ends in horizontal planes and having an inverted cone-shaped bore opening through said ends, the upper end of the casing being provided with an outstanding horizontal indicating finger formed integrally therewith, while the lower end of said casing is increased in thickness, a pair of pipe fittings formed integrally with the casing and opening into the bore thereof at two horizontally spaced points forming hot and cold water inlets, a hollow inverted cone-shaped valve plug rotatable in the bore and having a port for registration with either or both of said inlets, the upper edge of said plug being disposed flush with the upper end of the casing, while the lower end thereof is provided with an upright tubular discharge nipple formed integrally therewith and extending below the casing, the upper end of said nipple being externally threaded, while the lower end thereof is designed for reception in the flexible tube of a bath spray, a nut threaded on said nipple, a spring between said nut and the thickened lower end of the casing, an annular guard and stop flange rising from the nut around the spring into close proximity to said thickened lower end of the casing, said flange and said lower end being of the same diameter, the upper end of the valve plug being bulged up and provided on its upper face with indicating characters for coaction with the indicating finger on the casing, and the center of said upper end of the casing being formed with an integral boss for the attachment of a handle.

In testimony whereof I have hereunto set my hand in presence of two subscribing witnesses.

ANDREW J. BARR.

Witnesses:
 ADALINE GARBER,
 HOWARD P. WARWICK.

Copies of this patent may be obtained for five cents each, by addressing the "Commissioner of Patents, Washington, D. C."